United States Patent
Nguyen et al.

(10) Patent No.: US 10,360,573 B1
(45) Date of Patent: Jul. 23, 2019

(54) INTERACTIONS PLATFORM

(71) Applicant: Accenture Global Solutions Limited, Dublin (IE)

(72) Inventors: David T. Nguyen, San Jose, CA (US); Sunil Shettigar, Santa Clara, CA (US); Allison Youngdahl, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/247,068

(22) Filed: Jan. 14, 2019

Related U.S. Application Data

(60) Provisional application No. 62/616,843, filed on Jan. 12, 2018, provisional application No. 62/619,279, filed on Jan. 19, 2018.

(51) Int. Cl.

| | |
|---|---|
| *H04W 24/00* | (2009.01) |
| *G06Q 30/02* | (2012.01) |
| *H04W 4/029* | (2018.01) |
| *G06K 7/10* | (2006.01) |
| *H04W 8/00* | (2009.01) |
| *H04W 84/12* | (2009.01) |
| *H04L 29/12* | (2006.01) |
| *H04W 4/021* | (2018.01) |

(52) U.S. Cl.
CPC ..... *G06Q 30/0201* (2013.01); *G06K 7/10297* (2013.01); *H04W 4/029* (2018.02); *H04W 8/005* (2013.01); *H04L 61/6022* (2013.01); *H04W 4/021* (2013.01); *H04W 84/12* (2013.01)

(58) Field of Classification Search
CPC ..... H04W 4/029; H04W 8/005; H04W 84/12; H04W 4/021; G06Q 30/0201; G06K 7/10297; H04L 61/6022
See application file for complete search history.

(56) References Cited

U.S. PATENT DOCUMENTS

2016/0055360 A1* 2/2016 Haugarth ........... G06Q 30/0201
                                                                340/10.1
2017/0344624 A1* 11/2017 DeLuca ............ G06Q 30/0261

* cited by examiner

*Primary Examiner* — Barry W Taylor
(74) *Attorney, Agent, or Firm* — Fish & Richardson P.C.

(57) ABSTRACT

Methods, systems, and apparatus, including computer programs encoded on a computer storage medium, that relate to obtaining data that indicates a time that a MAC address was detected at a temporary site, obtaining data that indicates a time that a MAC address was detected at a non-temporary site, obtaining data that indicates that a first interaction with a first item occurred at the temporary site, obtaining data that indicates that a second interaction with a second item occurred at the non-temporary site, determining, that the MAC addresses match, determining that the time that the MAC address was detected at the temporary site occurred before the time that a MAC address was detected at the non-temporary site, determining that the first item and the second item match, and classifying the detection of the MAC address at the non-temporary address as being caused by the temporary site.

20 Claims, 3 Drawing Sheets

INTERACTIONS PLATFORM

CROSS-REFERENCE TO RELATED APPLICATIONS

This application claims the benefit of U.S. Provisional Application No. 62/616,843, filed Jan. 12, 2018, and U.S. Provisional Application No. 62/619,279, filed Jan. 19, 2018, the contents of which are incorporated by reference in their entireties.

FIELD

The present specification is related to analytics techniques that leverage a network-based platform and integrate data from multiple Internet of Things (IoT) devices and sensors.

BACKGROUND

The growth of data analytic platforms has expanded data processing into a tool used to leverage user identifiable data that is communicated in a wireless environment.

SUMMARY

Locations relating to businesses, such as retail stores, can provide close-proximity wireless connectivity for wireless devices to further connect to the Internet, for example, using the Wi-Fi protocol, IEEE (Institute of Electrical and Electronics Engineers) 802.11. As an example, a retailer can provide Wi-Fi connectivity for customers to use upon entering user-identifiable data during a login process with their wireless devices. Consequently, the retailer has information directly corresponding to the wireless device of the customer. Collecting any additional data, for example from interactions with the wireless device over Wi-Fi, can then be converted into opportunities to extract information to be analyzed by retailers about that customer.

In some wireless environments, anonymized data, or data that is not directly user-identifiable, can be communicated. An example of such an environment is the Internet of Things (IoT)-based environment, which extends networking capabilities to wide-ranging types of applications. Through the IoT framework, virtually any type of physical device, ranging from vehicles to thermostats, are capable of Internet based communication, providing information about the device itself or its surroundings. Although data that is specific to the device may be transmitted, IoT devices may not provide data in a format that is user-specific.

In some cases, wireless devices may intentionally obfuscate data communicated from the device (sometimes passively) that may be used for tracking, or identifying a device owner. There is a potential to process such anonymized data and/or device-specific data in a manner that can be further applied to inform retailers about a particular customer, such as how a particular customer engages in-store. Therefore, it is desirable to expand data analytic platforms to further leverage the data that may not be user identifiable, which is communicated by various wireless devices, e.g., mobile phones, and sensors.

The subject matter in this specification relates to retail analytics techniques that leverage a network-based platform (e.g., Internet cloud platform), and integrate data from multiple in-store Internet of Things (IoT) devices and sensors. Particular embodiments of the subject matter described in this specification can be implemented to realize one or more of the following advantages. The disclosed system implements a solution providing a platform that aggregates various streams of data collected from multiple devices, such as IoT devices, and sensors to provide real-time analytics. Furthermore, the system can provide to retailers different analytics regarding customers' in-store experiences, for example customer-product interactions, engagements, and feedback across various store locations. Moreover, the disclosed system and techniques allow data capture from customer devices in a manner that is non-intrusive to the customer. Moreover, the system and techniques can provide disparate data streams from different sensor types, which can be analyzed and correlated to create modular datasets for improved analytics. The system uses a single platform to provide analytics, data visualization, administration and configuration, thereby providing a centralized solution.

Details of one or more implementations of the subject matter described in this specification are set forth in the accompanying drawings and the description below. Other features, aspects, and potential advantages of the subject matter will become apparent from the description, and the drawings.

BRIEF DESCRIPTION OF THE DRAWINGS

Like reference numbers and designations in the various drawings indicate like elements.

DETAILED DESCRIPTION

Figure 1:
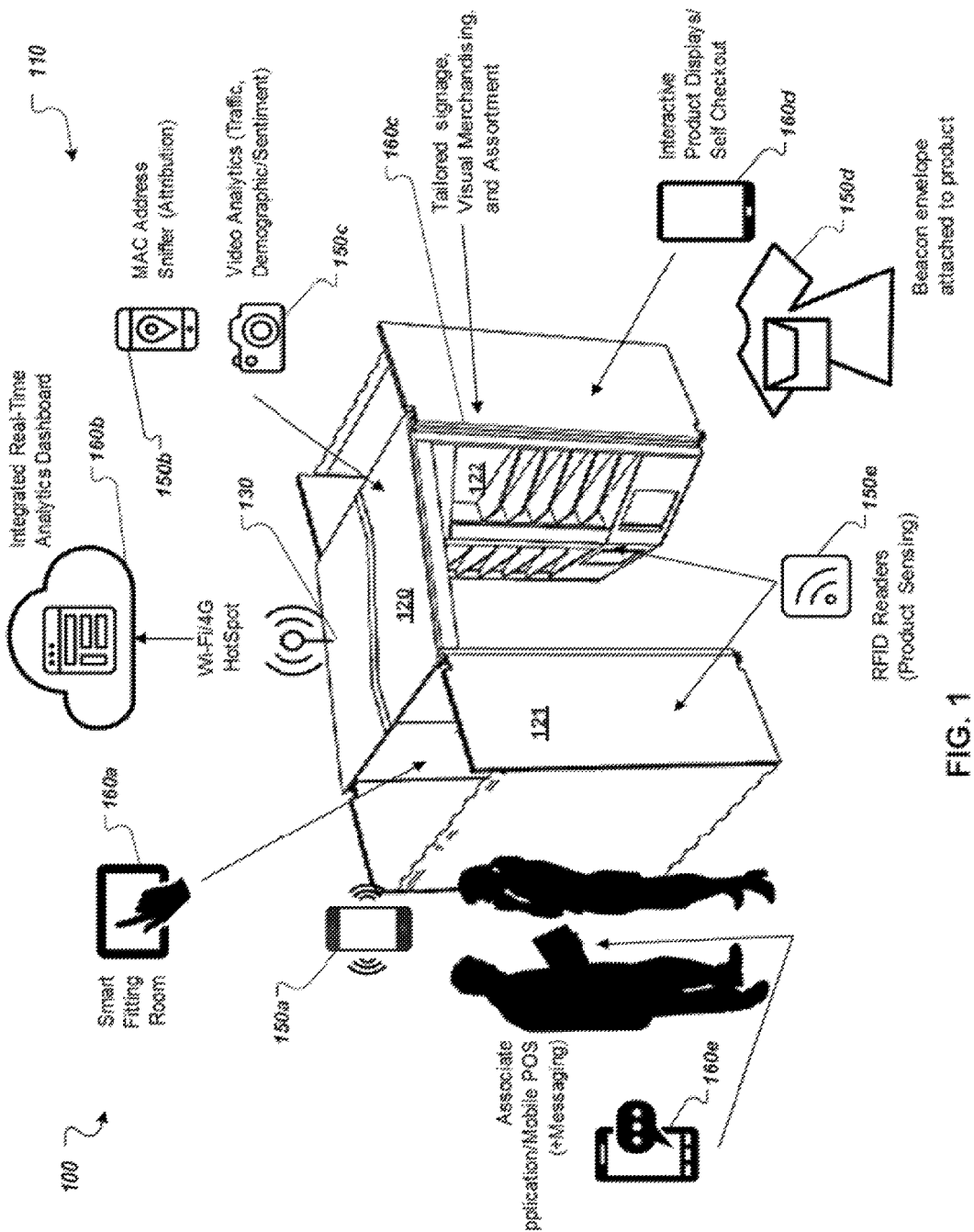
FIG. 1 illustrates an example of a retail environment implementing the retail interactions platform (RIP) system that collects data from various devices and sensors.

This specification describes systems and methods that include a retail interaction platform (RIP) that integrates data from multiple devices, such as Internet of Things (IoT) devices, and sensors. The RIP system can collect and analyze data relating to in-store interactive behavior of a customer. Various devices and sensors used, at least in part, with the RIP system can be situated at a first retail location, such as a portable retail set-up (e.g., pop-up store), in order to collect data that can be analyzed to derive visit analytics, such as conversions of customer traffic from the first retail location to a second retail location, such as a larger brick-and-mortar store. Additionally, the RIP system employs motion-sensing sensors (e.g., beacons) to collect and analyze data regarding a customer's engagement with products in the retail store. The RIP system can also store collected data in a network-based platform (e.g., Internet cloud). Moreover, based on the collected data, the RIP system can provide real-time analytics to retailers for trends, insight, and visualizations relating to various types of interactions around a customer's in-store experience, such as visitor sessions, product interactions, and store activity at various locations.

In an example of analytics, the RIP system may identify pop-up stores that sell a product well and indicate geographical areas that correspond to the pop-up stores identified to indicate candidate locations for additional brick-and-mortar stores. In another example, the RIP system may indicate whether a product sold well at a pop-up store so that a retailer may gauge whether to product should be brought into brick-and-mortar stores.

In yet another example, the RIP system may provide a product recommendation while a customer is in a store and display a visualization that indicates what the RIP system knows about the customer from past visits, e.g., previous items the customer tried on in a dressing room or purchased, so that the customer can better understand the reasoning behind the recommendation. In still another example, the RIP system may determine interests of particular customers and make those customers aware of fashion events in a store related to those interests.

In another example, the RIP system may use the collected data to provide retailers predicted future store trends, e.g., number of visitors, peak store times, and visit sessions. Retailers may use the predicted store trends to optimize ground staff or add in store fashion experts based on demographics captured on smart cameras. In yet another example, the RIP system may use the collected data to determine which items are most popular, for example the items being picked up the most, what areas of the store are more likely to be visited, if there is a disconnect between customers trying on items in the dressing room and purchasing, and if two items are being tried on at the same time meaning they might go well together.

In some implementations, the devices and sensors may have unique identifiers so that collected data may indicate the location that the data was collected from based on the identifiers. Accordingly, analysis may be applied at different levels of granularity. For example, using the same collected data, a first analysis may be performed for a branded store within a department store and a second analysis may be performed for a department store as a whole.

FIG. 1 illustrates an example of a retail environment 100 implementing the RIP system 110 collecting data from various devices and sensors 150a-e. In some cases, one or more of the aforementioned devices and sensors can be implemented as Internet of Things (IoT) devices, having the capability to communicate wirelessly at longer ranges and having comparatively lower device power consumption than some existing wireless systems. These long-range, low power (LRLP) wireless technologies for IoT devices can be leveraged by the RIP system 110, which is an Internet-based platform, to obtain data from sensors equipped with network connectivity.

The example of a retail environment 100 shown in FIG. 1 is a portable retail set-up, or pop-up store. In the case of a pop-up store, the retail environment 100 can serve as a temporary store for customers to interact with products. Accordingly, the example retail environment 100 in FIG. 1 can be remote from (and typically smaller than) a traditional brick-and-mortar store for the same retailer. The retail environment 100, as a pop-up, can be constructed at various desirable location, such as high foot-traffic areas (e.g., city centers, malls, and busy streets). The retail environment 100 in FIG. 1 includes a main structure 120, which can be a packable, partially enclosed, and modular building system, like a tent or a metal structure that serves to house customers and products when erected. The structure 120 can have dimensions lending itself to portability and limited spacing, for example structure 120 can be 5 ft.-by-5 ft., and can include multiple sections that are typically found in a traditional retail store. FIG. 1 shows the structure 120 as having a section for a fitting room 121, and an area for displaying various products 122 (e.g., shelves), which collectively allows the pop-up store to resemble a small boutique. The various components of the RIP system 110 can be installed at the location of the retail environment 100, or in-store, as well as other store locations associated with the retailer. In some cases, the retail environment 100 is used as temporary retail store and can be dismantled, or otherwise removed from the location after a time period (e.g., a week) relating to business purposes determined by the retailer.

The RIP system 110 can integrate data collected by the multiple devices and sensors 150a-e, in order to provide analytics related to converting a customer visit to the pop-up store, namely retail environment 100 to another retail location, such as the larger brick-and-mortar retail store. The RIP system 110 can also be employed for providing analytics relating to a product engagement by attaching sensors 150d (e.g., beacons) to products available at the retail environment 100, as discussed in greater detail further in reference to FIG. 1.

As illustrated in FIG. 1, the RIP system 110 includes one or more devices and sensors 150a-e that can be used to collect data communicated within a range proximate to the retail environment 100. The RIP system 110 is shown to include a wireless communication device depicted as a handheld mobile telephone 150a (e.g., a smartphone, or an application telephone). For the purposes of discussion, the mobile telephone 150a is described as being owned by, or being otherwise associated with, a customer visiting the retail environment 100. The RIP system 110 is also shown to employ various other devices and sensors configured to collect data for the platform, including, but not limited to: media access control (MAC) address sniffer 150b; video camera 150c; beacon 150d; and RFID reader 150e.

Although FIG. 1 shows one of each of the aforementioned devices, it should be appreciated that the any number of each of the devices can be installed in the retail environment 100, and subsequently employed by the RIP system 110 as deemed necessary and/or appropriate. Moreover, a single device, a group of devices, or all devices amongst devices 150a-e, or any combination thereof, can be selected by the platform for collecting particular types of data, as suitable. For instance, the MAC address sniffer 150b can be used to acquire customer's device MAC address at a specific store location; analytics of this collected data by the platform provides store visit information, visitor session, and cross-site visitor traffic; and sensors can be used to collect data analyzed for product engagement analytics. In some cases, various factors are considered for determining placement, installation, and configuration of the devices 150 a-e around the site. As an example, a MAC address sniffer 150b is positioned in manner allowing the signal-receiving element, such as the antenna of the device, to capture as much traffic as possible in the area, from a radial standpoint. Thus, the data streams collected from the multiple devices 150 a-e can be stored and integrated by the RIP system 110 to generate analytics regarding interactions and behaviors of multiple customers in-store, or while in the retail environment 100.

The multiple devices 150 a-e may provide collected data to a platform or cloud, where the collected data indicates unique store visit sessions for each location, repeat visitors, cross-site visitors from other locations, average duration of store visit, total visits by customer, and total visit duration. In a more particular example, the MAC address sniffer 150b may provide collected data that includes one or more of, but not limited to, the MAC address sniffer identifier, MAC address of device detected, visitor session time, entry time, and exit time. The beacon 150d may provide collected data that includes one or more of, but not limited to, beacon identifier, accelerometer coordinates, temperature, associated product stockkeeping unit (SKU), time, and duration of movement. The multiple devices 150 *a-e* may also provide other collected data such as camera heat maps and RFID readings to track product movement throughout the store from rack to fitting room to point of sale.

FIG. 1 shows that the retail environment 100 includes a Wi-Fi/4G hotspot 130, or access point, that can provide wireless network connectivity to devices within the wireless signal range of the hotspot 130. As an example, when the customer initially enters the retail environment 100, the mobile telephone 150*a* broadcasts (e.g., passively communicates) one or more Wi-Fi probe requests that are intercepted by MAC address sniffer 150*b*. The Wi-Fi probe requests can include a unique identifier corresponding to the mobile telephone 150*a*, such as the phone's MAC address. Thus, the MAC address sniffer 150*b* has captured a unique identifier, namely the MAC address from the mobile telephone 150*a* that can be used as an (indirect) identifier for the customer. In addition, the one or more MAC address sniffers 150*b* can actively read public packets in an attempt to identify other devices of customers that may be currently in the retail environment 100. Accordingly, analytics generated by the RIP system 110 can be related to all of the customers that have visited the pop-up store of retail environment 100. Although the customer's device is depicted as mobile telephone 150*a*, the customer can interact with the RIP system 110 using a computing device of alternative forms, including as a laptop computer, a tablet or slate computer, a personal digital assistant, an embedded system (e.g., a car navigation system), a wearable device, a desktop personal computer, or a computerized workstation.

In some cases, the mobile telephone 150*a* can communicate data, in addition to its MAC address, relating to other parameters that may be pertinent to analytics, such as location, time, and the like, and can also be collected and analyzed by the platform. The RIP system 110 can use MAC address data, and integrate it with other streams of data that are being collected via other devices and sensors of the system, as discussed in detail below.

Subsequently, the RIP system 110 can associate any pertinent information collected from mobile telephone 150*a*, and any resulting analytics, with the identified MAC address corresponding to that phone. To this end, the MAC address can be used by the RIP system 110 to effectively track and perform continued data collection from the mobile telephone 150*a* while the customer is in the retail environment 100. In turn, the RIP system 110 can use the uniquely identified data to capture a snapshot of the customer's visit. As an example, using the MAC address, or other obtainable unique identifiers corresponding to mobile telephone 150*a*, the RIP system 110 can analyze the customer's visit session data, and determine analytics indicative of the customer's in-store behavior, such as the customer's visit duration, and the customer's average in-store time. Based on these techniques using passively communicated data, such as the MAC address of the mobile telephone 150*a*, as customer-identifying parameters for analytics, the RIP system 110 can capture data from the mobile telephone 150*a* in a non-intrusive manner (e.g., customers do not need to install mobile apps, and log-in credentials are not required from customers).

A particular analytic of interest for the RIP system 110, is determining quantitative and/or qualitative conversion of customer visits from the pop-up store of retail environment 100 to a brick-and-mortar store associated with the same retailer (e.g., retailer providing retail environment 100). This can be achieved, as the RIP system 110 can maintain data associated with a uniquely identified mobile telephone 150*a* (e.g., via the MAC address), across multiple retail environments. For instance, after initially visiting the retail environment 100, the customer can have such an engaging shopping experience that it drives the customer to go to the brick-and-mortar store, as well. At the brick-and-mortar store, additional devices and sensors can be installed within that retail location. Collectively with the retail environment 100, the distributed devices and sensors form a larger scale RIP system 110 that collects and transmits data streams from the respective retail locations that can be analyzed by the platform. In some implementations, the RIP system 110 may determine from collected data that a customer has not visited a store in awhile and, in response, provide an incentive, such as a discount or a free item, to the customer to encourage the customer to visit again.

Referring back to example, another MAC address sniffer can be configured at the brick-and-mortar store to capture a MAC address from the mobile telephone 150*a* after the customer arrives at the store, in a manner similar to that discussed in reference to retail environment 100 above. In the event that the MAC addresses captured at both retail locations are the same, then the RIP system 110 can recognize that this is the previously identified mobile telephone 150*a*, and further indicating the same customer is now at the brick-and-mortar store. Additionally, data collected from the mobile device 150*a* at this location, or any subsequently visited retail locations outfitted with the RIP system 110, can be forwarded to the RIP system 110 and correlated (based in the MAC address) with the data obtained from the customer's previous visit to the pop-up store of retail environment 100. The MAC addresses of mobile devices of customers and associated data may be collected for every visit at every location, and the RIP system 110 may run simple to complex queries on the collected data to understand which customers are repeats and which customers were forwarded from a target pop-up store to the retail store. As a result, different data sets can be aggregated for a customer spanning a length of time, for multiple (e.g., repeat) visits, and across multiple sites, for as long as the MAC address persists for the mobile phone 150*a*, which lends itself for RIP system 110 to be able to provide trending analytics about the customer. These types of analytics can be used by retailers in business determinations associated with customer experience at the retail environment 100, such as: whether pop-up stores are effectively converting customer traffic into visits to their traditional stores (e.g., customer loyalty); and whether there is an increased likelihood that a particular customer at the pop-up store will visit traditional stores (e.g., potential customers).

In some implementations, the RIP system 110 adjusts its operation for scenarios that can potentially impact collected data, and further have unintended effects on analytics. Some mobile telephones are configured to randomize their MAC addresses at predetermined time intervals, or in some cases asynchronously. As a result, the techniques for linking visit data to a MAC address (to suggest the behavior of a particular customer) may be less effective, and can inject noise in the analytics. In a scenario where mobile telephone 150*a* randomizes its MAC address every 24 hours, the mobile telephone 150*a* can have a first MAC address identified at the pop-up store of retail environment 100. Nonetheless, if the customer visits the brick-and-mortar store more than a day later, the mobile telephone 150*a* may have randomized its MAC address, and a different MAC address for the mobile device 150 may be identified at this retail location for the same device and customer. Accordingly, in this example, the RIP system 110 using MAC address techniques would not correlate data collected during the cross-site visits, although both visits are related to the same customer.

To compensate for MAC address randomization, the RIP system 110 can employ various techniques, such as eliminating devices known to use randomization, or apply a set of approaches that can be used to help extract an identifier from other publicly transmitted data from a customer device. For example, the RIP system 110 may use a MAC Organizationally Unique Identifier (OUI) and a vendor lookup in software code, and eliminate devices that are not mobile telephones such as tablets, laptops, etc. Additionally or alternatively, in another example, the RIP system 110 may capture Bluetooth addresses of devices in lieu of MAC addresses, or in addition, so that even if the MAC address is randomized, the Bluetooth address, which may not be randomized, may be used to track a mobile telephone.

The RIP system 110 can be used to generate another analytic of interest relating to product engagement. In FIG. 1, the RIP system 110 includes a beacon 150d that can be attached to a product in the retail environment 100. A beacon 150d can be motion sensing sensor, or device configured with motion-sensing technology, allowing it to emit a wireless signal indicating a motion event. Additionally, multiple computing devices can be placed strategically in the retail environment, and configured to function in tandem with the beacons 150d, as listeners. These listeners can be installed with software, such as a mobile app, in order to detect when a nearby beacon 150d is signaling that the product is in motion.

For example, beacon 150d is attached to an article of clothing, illustrated as a dress in FIG. 1, which can be placed on a rack for display in retail environment 100. The customer, having an interest in dresses, might engage with the particular dress having the beacon 150d attached thereto while in the pop-up store, by picking it up and walking towards fitting area 121. In response to the movement of the dress, beacon 150d can transmit a signal indicating motion to a listener that may be placed close to the fitting area 121. In some cases, the beacon 150d also transmits data including a unique identifier corresponding to beacon 150d. The RIP system 110 can correlate the motion data with a specific product, and additionally integrate to abovementioned MAC address data. Consequently, the RIP system 110 can analyze and identify trends between customers and their interaction with particular products. As an example, the RIP system 110 can provide to retailers an indication that in each visit, a particular customer repeatedly engages with black leather dresses (as collected from beacons). Using this information, designers will have a better understanding of their customers' product preferences in their retail store so they can adjust their merchandise, store layout, and customer services accordingly. In some instances, a camera 150c can be used by the RIP system 110 to collect visual data augmenting the other streams of collected data (e.g., path/direction of customer upon store entry, heat map of most populated sections of store). Techniques can be applied to pictures, video, and other forms of visual data to extract pertinent information, such as visual recognition of customers and/or products.

In some implementations, the RIP system 110 may distinguish between a particular customer interacting with multiple items and multiple customers interacting with multiple items based on an opt-in from a customer. For example, when a customer goes into a dressing room, a screen at the dressing room may prompt the customer to enter their phone number so that the RIP system 110 may provide a more personalized experience. The RIP system 110 may then identify a profile for the customer from the phone number, and associate interactions with the particular products, brought into the dressing room by the customer, with the customer. Accordingly, if a customer enters the dressing room twice and enters their phone number both times, the RIP system 110 may determine that interactions were by the same customer instead of by two different customers. Further, if a customer enters the dressing room twice and does not enter their phone number both times, the RIP system 110 may determine that interactions were by different customers instead of by the same customer.

Moreover, the RIP system 110 is shown to include radio-frequency identification (RFID) readers 150e that can be installed at strategic locations in the retail environment 100. For example, one or more RFID readers 150e can be placed in the fitting room area 121 to passively sense nearby RFID tags attached to products. Using information collected by RFID readers 150e, retailers get valuable insights into customer-product engagements, like which products went into the fitting room 121 and which ones were put back on the rack or abandoned.

The RIP system 110 can also provide applications of the provided customer analytics, for example, real-time interactions that have been tailored, or otherwise adjusted based on analytics derived from the abovementioned techniques. One example illustrated in FIG. 1, is real-time data being provided to a sales associate, for example via a mobile app 160e provided on a mobile computing device used by the associate. For instance, the RIP system 110 can identify the customer after entering the retail environment 100, and retrieve analytics driven information that is specific to that customer, such as selling strategies and engagement strategies. The RIP system 110 can push this information to the mobile app 160e in real-time, and then display the information to the sales associate (e.g., messages) for engaging the customer while in-store.

Other real-time interactions can be provided by the RIP system 110 based on analytics, such as adjusting various aspects of the retail environment 100 to enhance the experience for a particular user. The RIP system 110 can be configured to perform reactive actions, for example adjusting the lighting in fitting area 121 to provide an ambience tailored to the customer. FIG. 1 illustrates multiple mechanisms and client applications supported by the RIP system 110, including: smart fitting room 160a; integrated real-time analytics dashboard 160b; tailored signage 160c; interactive product displays/self-checkout 160d; and associate application/mobile point-of-sale (POS) 160e. In another example of the RIP system 110 adjusting an environment based on analytics, the RIP system 110 may instruct a large interactive screen in a store to change what is displayed to show content customized for a passing by repeat visitor or based on which areas of the store that the shopper previously visited.

Figure 2:
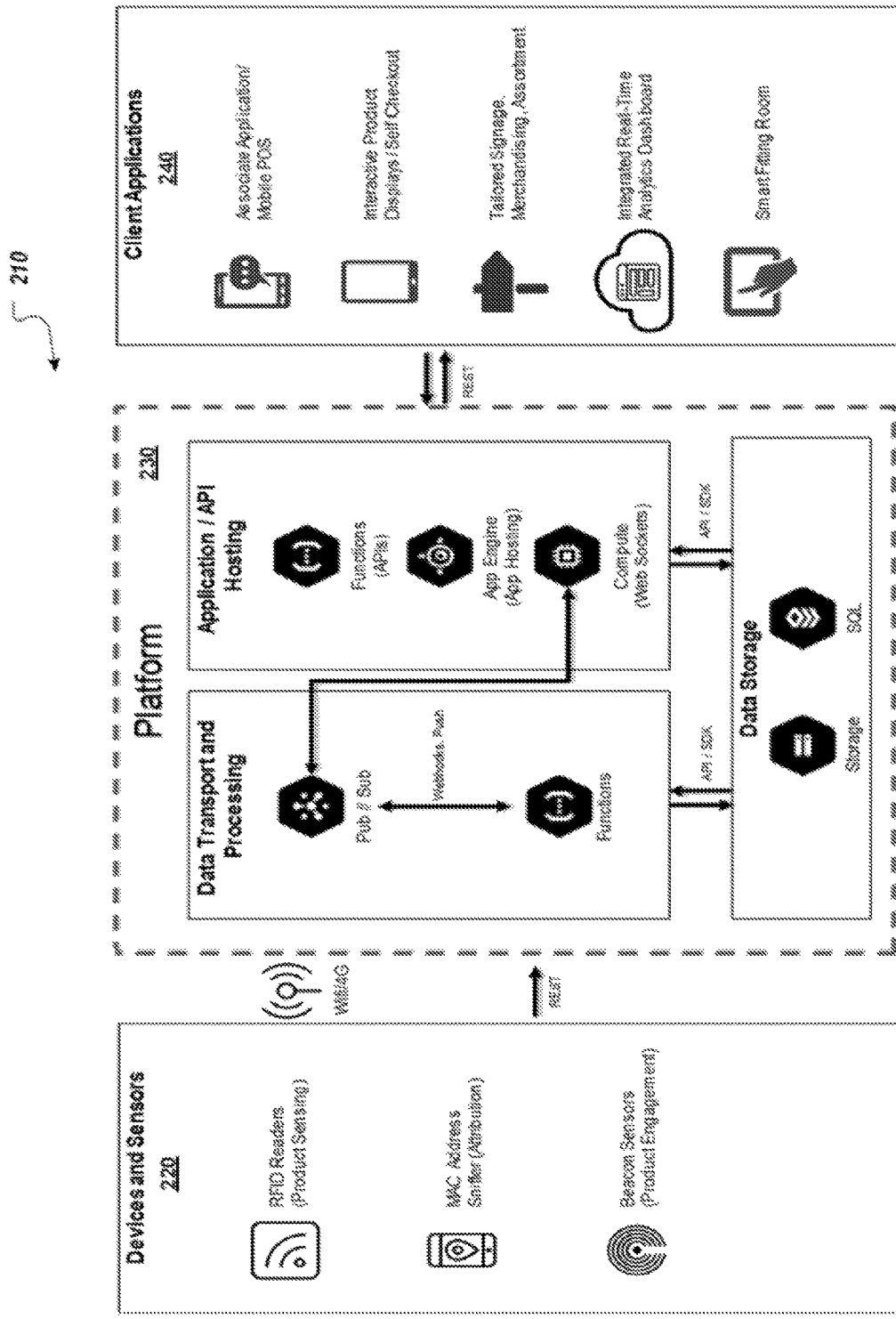
FIG. 2 illustrates a block diagram that depicts an example of the RIP system for implementing the collection, analysis, and application of customer interactive data relative to the example retail environment of FIG. 1.

FIG. 2 illustrates a block diagram that depicts an example of the RIP system 210 for implementing the collection, analysis, and application of customer interactive data relative to the example retail environment of FIG. 1. The RIP system 210 is shown to include three main modular components including: devices and sensors 220; platform 230; and client applications 240. FIG. 2 serves to illustrate that the RIP system 210 can be implemented as a highly scalable and decoupled system. For example, the devices and sensors 220 are installed in-store, for example the retail environment 100 shown in FIG. 1. While, the platform 230 can be implemented as a cloud-based platform employing resources accessible via a communications network, such as the Internet. The RIP system 210 provides a single platform solution, where retailers can use devices and sensors 220 to provide a detailed analysis of customer behavior in stores, and improve the in-store experience, similar to how retailers can currently optimize their electronic commerce (e-commerce) site to reduce the barrier to checkout with conversion funnels.

As an example, the platform 220 is implemented on one or more computer devices that may be used to implement the systems and methods described in this document. Moreover, any of other references to computer devices in the specification, for example mobile telephone 105*a* (shown in FIG. 1) can be described by the functions and components herein. Computing device is intended to represent various forms of digital computers, such as laptops, desktops, workstations, personal digital assistants, servers, blade servers, mainframes, and other appropriate computers. Computing device is also intended to represent various forms of mobile devices, such as personal digital assistants, cellular telephones, smartphones, and other similar computing devices. The components, their connections and relationships, and their functions, are meant to be examples only, and are not meant to limit implementations described and/or claimed in this document.

Figure 3:
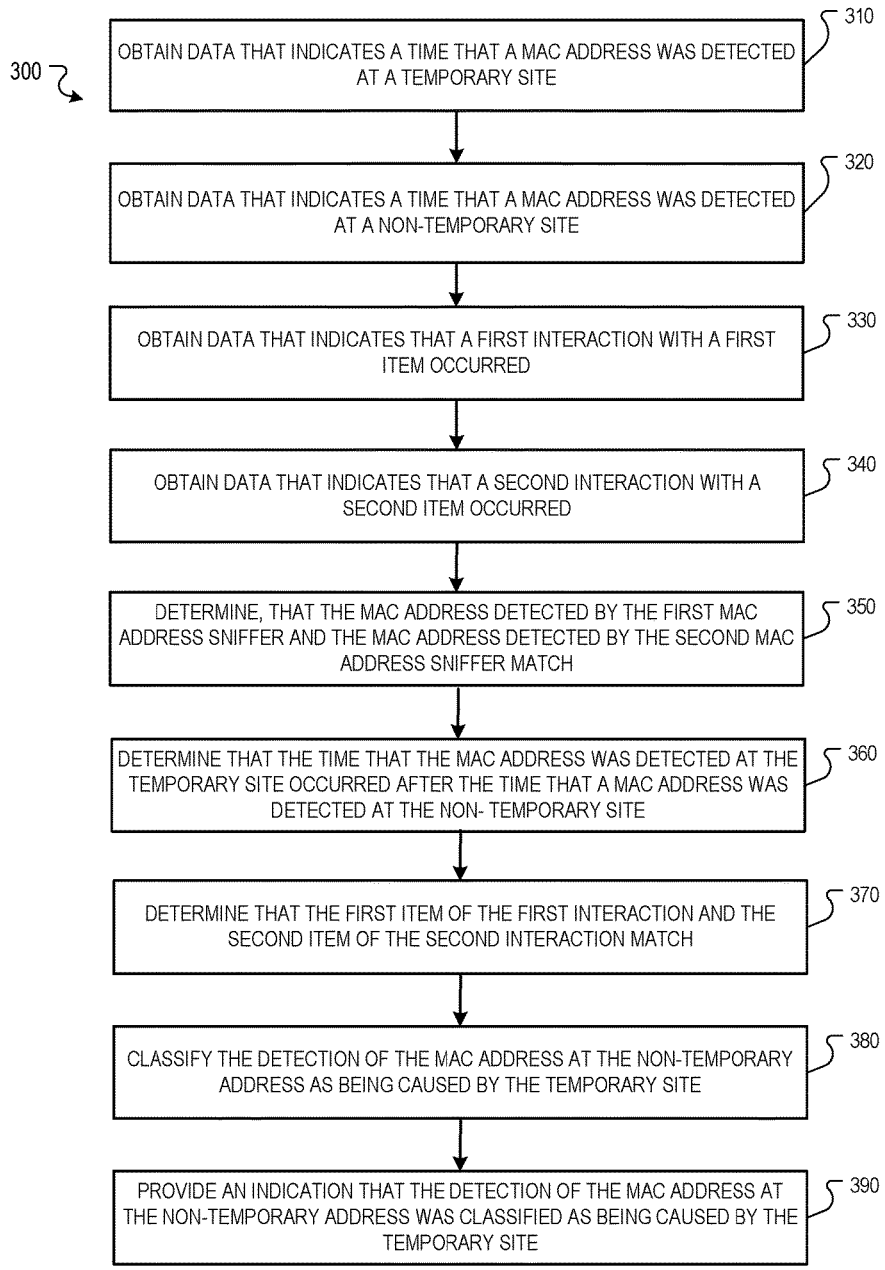
FIG. 3 illustrates a flowchart of an example process for collecting data from various devices and sensors.

FIG. 3 illustrates a flowchart of an example process 300 for collecting data from various devices and sensors. The process 300 may be performed by one or more of the RIP system 110 shown in FIG. 1 or the RIP system 210 shown in FIG. 2, or another system. Briefly, the process 300 includes obtaining data that indicates a time that a MAC address was detected at a temporary site (310), obtaining data that indicates a time that a MAC address was detected at a non-temporary site (320), obtaining data that indicates that a first interaction with a first item occurred (330), obtaining data that indicates that a second interaction with a second item occurred (340), determining, that the MAC address detected by the first MAC address sniffer and the MAC address detected by the second MAC address sniffer match (350), determining that the time that the MAC address was detected at the temporary site occurred before the time that a MAC address was detected at the non-temporary site (360), determining that the first item of the first interaction and the second item of the second interaction match (370), classifying the detection of the MAC address at the non-temporary address as being caused by the temporary site (380), and providing an indication that the detection of the MAC address at the non-temporary address was classified as being caused by the temporary site (390).

The process 300 includes obtaining data that indicates a time that a MAC address was detected at a temporary site (310). For example, the MAC address sniffer 150*b* located at a pop-up store for Company A may provide platform 230 data that indicates the MAC address "01-23-45-67-89-AB" was detected on Jan. 8, 2019 at 11:11 AM. In some implementations, the MAC address is that of a handheld mobile telephone of a visitor.

The process 300 includes obtaining data that indicates a time that a MAC address was detected at a non-temporary site (320). For example, another MAC address sniffer located at a brick-and-mortar store for Company A may provide platform 230 data that indicates the MAC address "01-23-45-67-89-AB" was detected on Jan. 8, 2019 at 4:11 PM.

The process 300 includes obtaining data that indicates that a first interaction with a first item occurred (330). For example, the beacon 150*d* may provide platform 230 data that indicates that a dress at the pop-up store was moved. In some implementations, obtaining, from a first beacon attached to a first item at the temporary site, data that indicates that a first interaction with the first item occurred includes obtaining data that indicates that a first interaction with the first item occurred from a motion sensor that is configured to detect when the first item is moved. For example, the beacon 150*d* may be a motion sensor that detects when the first item is moved.

The process 300 includes obtaining data that indicates that a second interaction with a second item occurred (340). For example, another beacon may provide platform 230 data that indicates that another dress at the brick-and-mortar store was moved.

The process 300 includes determining, that the MAC address detected by the first MAC address sniffer and the MAC address detected by the second MAC address sniffer match (350). For example, the platform 230 may determine that the MAC address "01-23-45-67-89-AB" indicated by the data from the MAC address sniffer 150*b* and the MAC address "01-23-45-67-89-AB" indicated by the data from the other MAC address sniffer are identical so match.

The process includes determining that the time that the MAC address was detected at the temporary site occurred before the time that a MAC address was detected at the non-temporary site (360). For example, the platform 230 may determine that Jan. 8, 2019 at 11:11 AM was before Jan. 8, 2019 at 4:11 PM. In some implementations, determining that the time that the MAC address was detected at the temporary site occurred before the time that a MAC address was detected at the non-temporary site is determined in response to determining, that the MAC address detected by the first MAC address sniffer and the MAC address detected by the second MAC address sniffer match.

The process 300 includes determining that the first item of the first interaction and the second item of the second interaction match (370). For example, the platform 230 may determine that the first item and the second item are both a particular type of dress. In some implementations, determining that the first item of the first interaction and the second item of the second interaction match includes where the data that indicates the time that the MAC address was detected includes an entry time and an exit time, obtaining, from a first beacon attached to a first item at the temporary site, data that indicates that a first interaction with the first item occurred includes obtaining a time that a time for the first interaction, and determining that the time for the first interaction occurred between the entry time and the exit time.

The process 300 includes classifying the detection of the MAC address at the non-temporary address as being caused by the temporary site (380). For example, the platform 230 may classify a visit by a customer to the brick-and-mortar store and caused by the pop-up store.

The process 300 includes providing an indication that the detection of the MAC address at the non-temporary address was classified as being caused by the temporary site (390). For example, the platform 230 may provide a report to a device used by a user from Company X, where the report indicates that the customer visited the brick-and-mortar store on Jan. 8, 2019 at 4:11 PM because of the customer's visit to the pop-up store on Jan. 8, 2019 at 11:11 AM.

Computing device can include a processor, memory, a storage device, a high-speed interface connecting to memory and high-speed expansion ports, and a low speed interface connecting to low speed bus and storage device. Each of the components, are interconnected using various busses, and may be mounted on a common motherboard or in other manners as appropriate. The processor can process instructions for execution within the computing device, including instructions stored in the memory or on the storage device to display graphical information for a GUI on an external input/output device, such as display coupled to high-speed interface. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory stores information within the computing device. In one implementation, the memory is a volatile memory unit or units. In another implementation, the memory is a non-volatile memory unit or units. The memory may also be another form of computer-readable medium, such as a magnetic or optical disk.

The storage device is capable of providing mass storage for the computing device. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory, the storage device, or memory on processor.

The high-speed controller manages bandwidth-intensive operations for the computing device, while the low speed controller manages lower bandwidth-intensive operations. Such allocation of functions is an example only. In one implementation, the high-speed controller is coupled to memory, display (e.g., through a graphics processor or accelerator), and to high-speed expansion ports, which may accept various expansion cards. In the implementation, low-speed controller is coupled to storage device and low-speed expansion port. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device may be implemented in a number of different forms, as shown in the figure. For example, it may be implemented as a standard server, or multiple times in a group of such servers. It may also be implemented as part of a rack server system. In addition, it may be implemented in a personal computer such as a laptop computer. Alternatively, components from computing device may be combined with other components in a mobile device. Each of such devices may contain one or more of computing device, and an entire system may be made up of multiple computing devices communicating with each other.

Computing device includes a processor, memory, an input/output device such as a display, a communication interface, and a transceiver, among other components. The device may also be provided with a storage device, such as a microdrive or other device, to provide additional storage. Each of the components, are interconnected using various buses, and several of the components may be mounted on a common motherboard or in other manners as appropriate.

The processor can execute instructions within the computing device, including instructions stored in the memory. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device, such as control of user interfaces, applications run by device, and wireless communication by device.

Processor may communicate with a user through control interface and display interface coupled to a display. The display may be, for example, a TFT (Thin-Film-Transistor Liquid Crystal Display) display or an OLED (Organic Light Emitting Diode) display, or other appropriate display technology. The display interface may comprise appropriate circuitry for driving the display to present graphical and other information to a user. The control interface may receive commands from a user and convert them for submission to the processor. In addition, an external interface may be provide in communication with processor, so as to enable near area communication of device $50 with other devices. External interface may provide, for example, for wired communication in some implementations, or for wireless communication in other implementations, and multiple interfaces may also be used.

The memory stores information within the computing device. The memory can be implemented as one or more of a computer-readable medium or media, a volatile memory unit or units, or a non-volatile memory unit or units. Expansion memory may also be provided and connected to device through expansion interface, which may include, for example, a SIMM (Single In Line Memory Module) card interface. Such expansion memory may provide extra storage space for device, or may also store applications or other information for device. Specifically, expansion memory may include instructions to carry out or supplement the processes described above, and may include secure information also. Thus, for example, expansion memory may be provide as a security module for device, and may be programmed with instructions that permit secure use of device. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory, expansion memory, or memory on processor that may be received, for example, over transceiver or external interface.

Device may communicate wirelessly through communication interface, which may include digital signal processing circuitry where necessary. Communication interface may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver. In addition, short-range communication may occur, such as using a Bluetooth, Wi-Fi, or other such transceiver (not shown). In addition, GPS (Global Positioning System) receiver module may provide additional navigation- and location-related wireless data to device, which may be used as appropriate by applications running on device.

Device may also communicate audibly using audio codec, which may receive spoken information from a user and convert it to usable digital information. Audio codec may likewise generate audible sound for a user, such as through a speaker, e.g., in a handset of device. Such sound may include sound from voice telephone calls, may include recorded sound (e.g., voice messages, music files, etc.) and may include sound generated by applications operating on the device.

The computing device may be implemented in a number of different forms, as shown in the figure. For example, it may be implemented as a cellular telephone. It may also be implemented as part of a smartphone, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

In using the RIP system 210, business entities related to the retail environment 100, such as retailers, can receive analytics that can provide a holistic picture of the business, where the customer's in-store shopping journey can be tracked and analyzed in a manner analogous to an e-commerce purchase path. E-commerce is typically associated with extensive analytics, due to an ease of directly linking a customer's computer interactions (e.g., clicks and purchases) to customer behavior, in order to optimize the site for improving the customer's on-line retail experience, such as a conversion funnel process. In comparison, analytics relating to a customer's in-store experience, for example while shopping at a retail environment 100 shown in FIG. 1, are limited, and can cause a disconnect between physical and on-line customer experiences for retailers.

To address these limitations, analytics from the RIP system 210 are provided to retailers that can indicate various types of interactions related to customer behaviors and physical retail environments, including but not limited to: performance of a particular store location; product popularity; cross-site visitor traffic; point-of-sale (POS) checkouts; and cart abandonments. From the analytics provided by the RIP system 210, retailers can then perform various actions deemed appropriate to increase sales and create a more compelling in-store experience, such as adjustments to relevant aspects of the store, crafting personalized shopping experiences, modifying inventory, and optimizing checkout.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems.

What is claimed is:
1. A computer-implemented method comprising:
obtaining, from a first media access control (MAC) address sniffer at a temporary site, data that indicates both (i) a time that a MAC address was detected at the temporary site and (ii) the MAC address that was detected at the temporary site;
obtaining, from a second MAC address sniffer at a non-temporary site, data that indicates both (i) a time that a MAC address was detected at the non-temporary site and (ii) the MAC address that was detected at the non-temporary site;
obtaining, from a first beacon attached to a first item at the temporary site, data that indicates that a first interaction with the first item occurred;
obtaining, from a second beacon attached to a second item at the non-temporary site, data that indicates that a second interaction with the second item occurred;

determining, that the MAC address detected by the first MAC address sniffer and the MAC address detected by the second MAC address sniffer match;

determining that the time that the MAC address was detected at the temporary site occurred before the time that a MAC address was detected at the non-temporary site;

determining that the first item of the first interaction and the second item of the second interaction match;

in response to determining (i) that the MAC address detected by the first MAC address sniffer and the MAC address detected by the second MAC address sniffer match, (ii) that the time that the MAC address was detected at the temporary site occurred before the time that a MAC address was detected at the non-temporary site, and (iii) that the first item of the first interaction and the second item of the second interaction match, classifying the detection of the MAC address at the non-temporary address as being caused by the temporary site; and providing an indication that the detection of the MAC address at the non-temporary address was classified as being caused by the temporary site.

2. The method of claim 1, wherein obtaining, from a first beacon attached to a first item at the temporary site, data that indicates that a first interaction with the first item occurred comprises:

obtaining data that indicates that a first interaction with the first item occurred from a motion sensor that is configured to detect when the first item is moved.

3. The method of claim 1, wherein the MAC address is that of a handheld mobile telephone of a visitor.

4. The method of claim 1, wherein determining that the first item of the first interaction and the second item of the second interaction match comprises:

determining that both the first item and the second item are a same type of item.

5. The method of claim 1, wherein determining that the first item of the first interaction and the second item of the second interaction match comprises:

wherein the data that indicates the time that the MAC address was detected includes an entry time and an exit time, obtaining, from a first beacon attached to a first item at the temporary site, data that indicates that a first interaction with the first item occurred comprises obtaining a time that a time for the first interaction; and determining that the time for the first interaction occurred between the entry time and the exit time.

6. The method of claim 1, wherein determining, that the MAC address detected by the first MAC address sniffer and the MAC address detected by the second MAC address sniffer match comprises:

determining the MAC address detected by the first MAC address sniffer and the MAC address detected by the second MAC address sniffer are identical.

7. The method of claim 1, wherein determining that the time that the MAC address was detected at the temporary site occurred before the time that a MAC address was detected at the non-temporary site is determined in response to determining, that the MAC address detected by the first MAC address sniffer and the MAC address detected by the second MAC address sniffer match.

8. A system comprising:

one or more computers and one or more storage devices storing instructions that are operable, when executed by the one or more computers, to cause the one or more computers to perform operations comprising:

obtaining, from a first media access control (MAC) address sniffer at a temporary site, data that indicates both (i) a time that a MAC address was detected at the temporary site and (ii) the MAC address that was detected at the temporary site;

obtaining, from a second MAC address sniffer at a non-temporary site, data that indicates both (i) a time that a MAC address was detected at the non-temporary site and (ii) the MAC address that was detected at the non-temporary site;

obtaining, from a first beacon attached to a first item at the temporary site, data that indicates that a first interaction with the first item occurred;

obtaining, from a second beacon attached to a second item at the non-temporary site, data that indicates that a second interaction with the second item occurred;

determining, that the MAC address detected by the first MAC address sniffer and the MAC address detected by the second MAC address sniffer match;

determining that the time that the MAC address was detected at the temporary site occurred before the time that a MAC address was detected at the non-temporary site;

determining that the first item of the first interaction and the second item of the second interaction match;

in response to determining (i) that the MAC address detected by the first MAC address sniffer and the MAC address detected by the second MAC address sniffer match, (ii) that the time that the MAC address was detected at the temporary site occurred before the time that a MAC address was detected at the non-temporary site, and (iii) that the first item of the first interaction and the second item of the second interaction match, classifying the detection of the MAC address at the non-temporary address as being caused by the temporary site; and providing an indication that the detection of the MAC address at the non-temporary address was classified as being caused by the temporary site.

9. The system of claim 8, wherein obtaining, from a first beacon attached to a first item at the temporary site, data that indicates that a first interaction with the first item occurred comprises:

obtaining data that indicates that a first interaction with the first item occurred from a motion sensor that is configured to detect when the first item is moved.

10. The system of claim 8, wherein the MAC address is that of a handheld mobile telephone of a visitor.

11. The system of claim 8, wherein determining that the first item of the first interaction and the second item of the second interaction match comprises:

determining that both the first item and the second item are a same type of item.

12. The system of claim 8, wherein determining that the first item of the first interaction and the second item of the second interaction match comprises:

wherein the data that indicates the time that the MAC address was detected includes an entry time and an exit time, obtaining, from a first beacon attached to a first item at the temporary site, data that indicates that a first interaction with the first item occurred comprises obtaining a time that a time for the first interaction; and determining that the time for the first interaction occurred between the entry time and the exit time.

13. The system of claim 8, wherein determining, that the MAC address detected by the first MAC address sniffer and the MAC address detected by the second MAC address sniffer match comprises:

determining the MAC address detected by the first MAC address sniffer and the MAC address detected by the second MAC address sniffer are identical.

14. The system of claim 8, wherein determining that the time that the MAC address was detected at the temporary site occurred before the time that a MAC address was detected at the non-temporary site is determined in response to determining, that the MAC address detected by the first MAC address sniffer and the MAC address detected by the second MAC address sniffer match.

15. A non-transitory computer-readable medium storing instructions executable by one or more computers which, upon such execution, cause the one or more computers to perform operations comprising:

obtaining, from a first media access control (MAC) address sniffer at a temporary site, data that indicates both (i) a time that a MAC address was detected at the temporary site and (ii) the MAC address that was detected at the temporary site;

obtaining, from a second MAC address sniffer at a non-temporary site, data that indicates both (i) a time that a MAC address was detected at the non-temporary site and (ii) the MAC address that was detected at the non-temporary site;

obtaining, from a first beacon attached to a first item at the temporary site, data that indicates that a first interaction with the first item occurred;

obtaining, from a second beacon attached to a second item at the non-temporary site, data that indicates that a second interaction with the second item occurred;

determining, that the MAC address detected by the first MAC address sniffer and the MAC address detected by the second MAC address sniffer match;

determining that the time that the MAC address was detected at the temporary site occurred before the time that a MAC address was detected at the non-temporary site;

determining that the first item of the first interaction and the second item of the second interaction match;

in response to determining (i) that the MAC address detected by the first MAC address sniffer and the MAC address detected by the second MAC address sniffer match, (ii) that the time that the MAC address was detected at the temporary site occurred before the time that a MAC address was detected at the non-temporary site, and (iii) that the first item of the first interaction and the second item of the second interaction match, classifying the detection of the MAC address at the non-temporary address as being caused by the temporary site; and providing an indication that the detection of the MAC address at the non-temporary address was classified as being caused by the temporary site.

16. The medium of claim 15, wherein obtaining, from a first beacon attached to a first item at the temporary site, data that indicates that a first interaction with the first item occurred comprises:

obtaining data that indicates that a first interaction with the first item occurred from a motion sensor that is configured to detect when the first item is moved.

17. The medium of claim 15, wherein the MAC address is that of a handheld mobile telephone of a visitor.

18. The medium of claim 15, wherein determining that the first item of the first interaction and the second item of the second interaction match comprises:

determining that both the first item and the second item are a same type of item.

19. The medium of claim 15, wherein determining that the first item of the first interaction and the second item of the second interaction match comprises:

wherein the data that indicates the time that the MAC address was detected includes an entry time and an exit time, obtaining, from a first beacon attached to a first item at the temporary site, data that indicates that a first interaction with the first item occurred comprises obtaining a time that a time for the first interaction; and determining that the time for the first interaction occurred between the entry time and the exit time.

20. The medium of claim 15, wherein determining, that the MAC address detected by the first MAC address sniffer and the MAC address detected by the second MAC address sniffer match comprises:

determining the MAC address detected by the first MAC address sniffer and the MAC address detected by the second MAC address sniffer are identical.

\* \* \* \* \*